(12) United States Patent
Bogdanovic (10) Patent No.: US 7,497,313 B2
(45) Date of Patent: Mar. 3, 2009

(54) CONVEYOR IDLER WITH LOCKING DEVICE FOR PREVENTING REVERSE ROTATION

(75) Inventor: Bogdan Bogdanovic, Krugersdorp (ZA)

(73) Assignee: Roller brake (Proprietary) Limited, Randburg (ZA)

( * ) Notice: Subject to any disclaimer, the term of this patent is extended or adjusted under 35 U.S.C. 154(b) by 0 days.

(21) Appl. No.: 10/542,114

(22) PCT Filed: Jan. 13, 2004

(86) PCT No.: PCT/IB2004/000042

§ 371 (c)(1),
(2), (4) Date: Dec. 1, 2005

(87) PCT Pub. No.: WO2004/063062

PCT Pub. Date: Jul. 29, 2004

(65) Prior Publication Data

US 2006/0137958 A1    Jun. 29, 2006

(30) Foreign Application Priority Data

Jan. 14, 2003   (ZA)   .................... 03/0371
Jul. 29, 2003   (ZA)   .................... 03/5822

(51) Int. Cl.
*B65G 13/00*   (2006.01)

(52) U.S. Cl. ..................... 193/35 A; 193/37

(58) Field of Classification Search ............... 193/35 A, 193/35 R, 37

See application file for complete search history.

(56) References Cited

U.S. PATENT DOCUMENTS

| 2,886,153 | A | * | 5/1959 | Cobb | ...................... 192/45.1 |
| 2,912,086 | A | * | 11/1959 | Troendl et al. | ........... 192/45.1 |
| 3,104,744 | A | | 9/1963 | Wade | |
| 3,166,169 | A | | 1/1965 | Wade et al. | |
| 5,695,031 | A | | 12/1997 | Kurita et al. | |
| 5,941,355 | A | * | 8/1999 | Iga | ............................ 192/45 |
| 6,095,302 | A | | 8/2000 | Cheng et al. | |

FOREIGN PATENT DOCUMENTS

WO    WO 01/32537  A    5/2001

* cited by examiner

*Primary Examiner*—Mark A Deuble
(74) *Attorney, Agent, or Firm*—Frommer Lawrence & Haug LLP; Ronald R. Santucci (57) ABSTRACT

A conveyor idler includes a drum having an outer surface and an inner surface, a shaft (24) about which the drum can rotate in a forward direction, a locking mechanism for preventing the drum from rotating in a reverse direction (R) but which locking mechanism permits rotation of the drum in the forward direction, the locking mechanism having at least one wedging surface (44) fixed directly or indirectly to the drum, and a locking member (38) interposed between the wedging surface and the shaft, the locking member being rotatable about the shaft when the drum rotates in the forward direction, but when an attempt is made to rotate the drum in the reverse direction the locking member becomes releasably wedged between the wedging surface and the shaft, or a surface fixed to the shaft, thereby preventing the drum from rotating in the reverse direction.

23 Claims, 9 Drawing Sheets

Fig.13 under publication number WO 2004/063062 A1 and claims priority benefits of South African Patent Application No. ZA 2003/0371 filed Jan. 14, 2003 and South African Patent Application No. ZA 2003/5822 filed Jul. 29, 2003.

CONVEYOR IDLER WITH LOCKING DEVICE FOR PREVENTING REVERSE ROTATION

This application is a 371 of PCT/IB2004/000042 filed on Jan. 13, 2004, published on Jul. 29, 2004 under publication number WO 2004/063062 A1 and claims priority benefits of South African Patent Application No. ZA 2003/0371 filed Jan. 14, 2003 and South African Patent Application No. ZA 2003/5822 filed Jul. 29, 2003.

FIELD OF THE INVENTION

This invention relates to a conveyor idler which can rotate in one direction only.

BACKGROUND TO THE INVENTION

International patent application PCT/IB00/01571 published under WO 01/32537A1 describes a conveyor idler with a braking mechanism within the drum of the conveyor idler. The braking mechanism permits the drum to rotate in a forward direction but not in a reverse direction. The braking mechanism consists of a brake guide fixed to the shaft of the conveyor idler. The brake guide has recesses on its circumference. On each of the recesses a ball bearing is located. One of the ball bearings becomes wedged between the inner surface of the drum and its recess on the brake guide when an attempt is made to rotate the drum in the reverse direction thereby preventing the drum from being rotated in the reverse direction. The conveyor idler suffers from the disadvantage that generally only one of the ball bearings becomes wedged between the drum and the brake guide and therefore that all the locking torque is transferred through only one ball bearing. In addition, the brake guide is relatively large and the ball bearings contact the drum even when it rotates in the forward direction. This contact results in the generation of noise and in wear.

SUMMARY OF THE INVENTION

According to the invention a conveyor idler includes a drum having an outer surface and an inner surface, a shaft about which the drum can rotate in a forward direction, a locking mechanism for preventing the drum from rotating in a reverse direction but which locking mechanism permits rotation of the drum in the forward direction, the locking mechanism having at least one wedging surface fixed directly or indirectly to the drum, and a locking member interposed between the wedging surface and the shaft, the locking member being rotatable about the shaft when the drum rotates in the forward direction, but when an attempt is made to rotate the drum in the reverse direction the locking member becomes releasably wedged between the wedging surface and the shaft or a surface fixed to the shaft thereby preventing the drum from rotating in the reverse direction.

A plurality of wedging surfaces may be provided with a locking member being provided between each wedging surface and the shaft.

The plurality of locking members are preferably connected together by connecting means. The connecting means may be a locking housing having circumferentially spaced cages for the locking members.

Each locking member is preferably rotatably located within its cage. Each locking member is preferably also radially movable within its cage.

The locking housing may consist of two axially spaced end members, with the cages being formed between the end members and between pairs of spaced axially extending walls located between the end members.

The cages preferably extend radially outwardly beyond the circumference of the end members.

A reinforcing web may extend between the end members.

The wedging surface preferably includes a ramp. The wedging surface preferably forms part of, or is fixed to, an end cap or closure of the sleeve, the end cap or closure being fixed to the drum. The wedging surface may be located within a locking housing receptacle which is fixed to the end cap. The locking housing receptacle may include a plurality of circumferentially spaced slots which engage a plurality of radially extending webs in the end cap thereby to fix the locking housing receptacle to the end cap.

In another embodiment of the invention the wedging surface may be located within a locking housing receptacle which is fixed to the inner surface of the sleeve.

The locking member may be a ball bearing or roller bearing.

According to another aspect of the invention a locking mechanism for a conveyor idler for releasably locking a drum of the conveyor idler from rotating about a shaft in a reverse direction but which permits rotation of the drum in a forward direction about the shaft, the locking mechanism includes a connecting means connecting a plurality of circumferentially spaced locking members together which locking members are in use located between wedging surfaces fixed to the drum so that in use when an attempt is made to rotate the drum in the reverse direction, the locking members will simultaneously become releasably wedged between the shaft and the wedging surfaces thereby preventing the drum from being rotated in the reverse direction.

The connecting means preferably include a cage for each locking member.

Each locking member is preferably rotatable within its cage. Each locking member is preferably also radially moveable within its cage.

The locking housing may consist of two axially spaced end members, with the cages being formed between the end members and between pairs of spaced axially extending walls located between the end members. The cages may extend radially outwardly beyond the circumference of the end members. A reinforcing web may extend between the end members.

The locking mechanism may include a receptacle for the locking members and their connecting means, the receptacle containing the wedging surfaces and having fixing means for fixing the receptacle directly or indirectly to the drum.

The fixing means may comprise a plurality of spaced slots for engaging a plurality of radially extending webs in an end cap of the conveyor idler.

According to another aspect of the invention an end cap for a conveyor idler includes a receptacle for a plurality of circumferentially spaced locking members, the receptacle having a wedging surface for each locking member so that in use a drum of the conveyor idler to which the end cap is fixed can rotate in a forward direction but not in a reverse direction because the locking members become releasably wedged between their wedging surfaces and a shaft of the conveyor idler.

The receptacle may be integrally formed with the end cap. Alternatively, the receptacle may be located within a separate housing which is fixed to the end cap. The separate housing may include a plurality of circumferentially spaced slots which engage a plurality of radially extending webs in the end cap to fix the separate housing to the end cap.

DETAILED DESCRIPTION OF THE DRAWINGS

Figure 1:
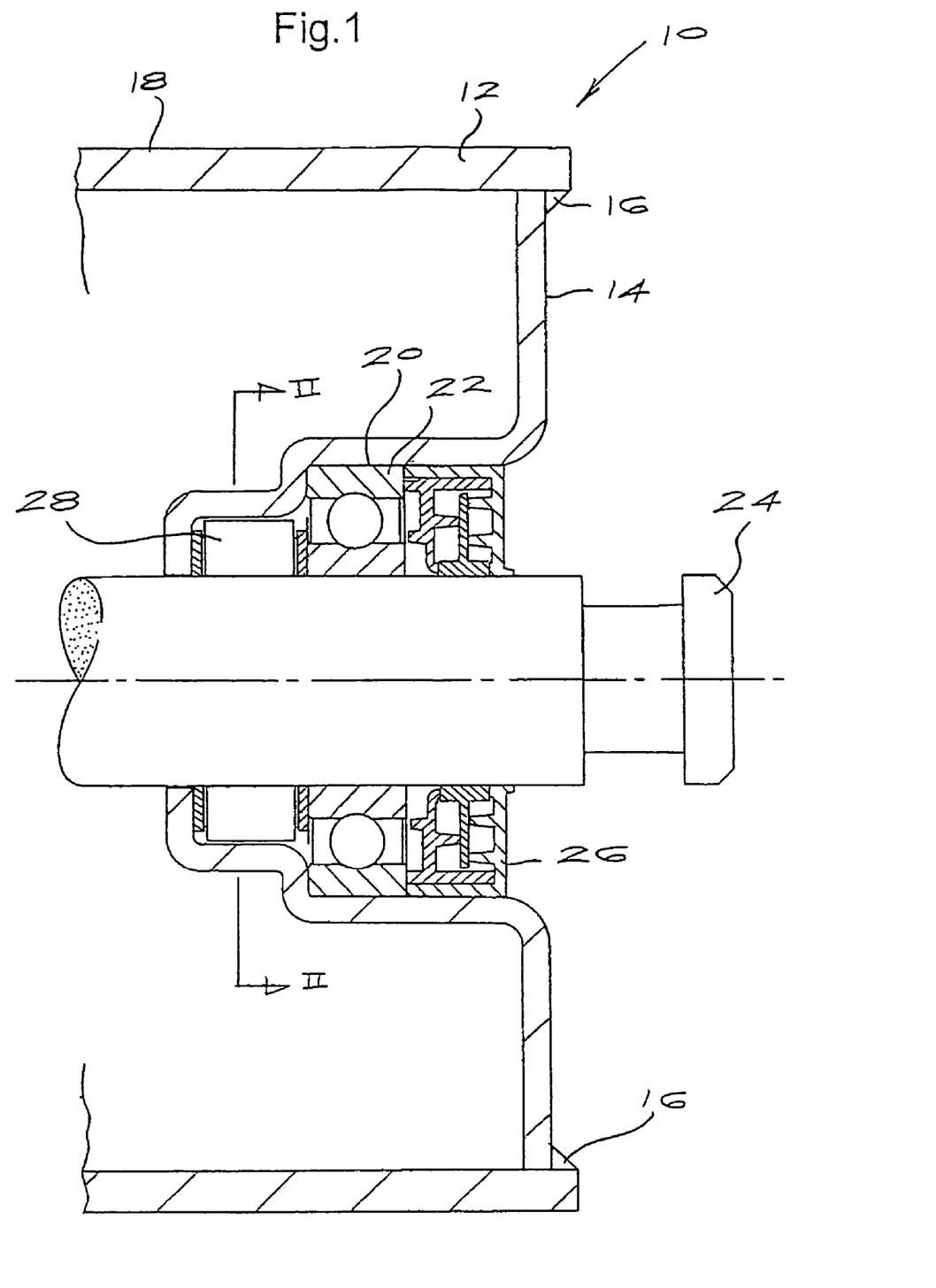
FIG. 1 is a cross-sectional view of one end of a conveyor idler according to the invention.

Referring firstly to FIG. 1, a conveyor idler 10 has a drum 12 with a pair of end caps 14 of which only one is shown. The end caps 14 are welded by welds 16 to the drum 12. The drum 12 is also known as a sleeve or shell.

The drum 12 has an outer surface 18 over which a conveyor belt (not shown) can run. Each end cap 14 has a bearing housing 20 for a bearing 22 which enables a shaft 24 to rotate relative to the end cap 14 and hence relative to the drum 12. A labyrinth seal 26 protects the bearing 22 from the ingress of foreign matter.

A locking housing 28 is located between the end cap 14 and the shaft 24. It will be appreciated that a locking housing 28 can be located in one or both of the end caps 14.

Figure 2:
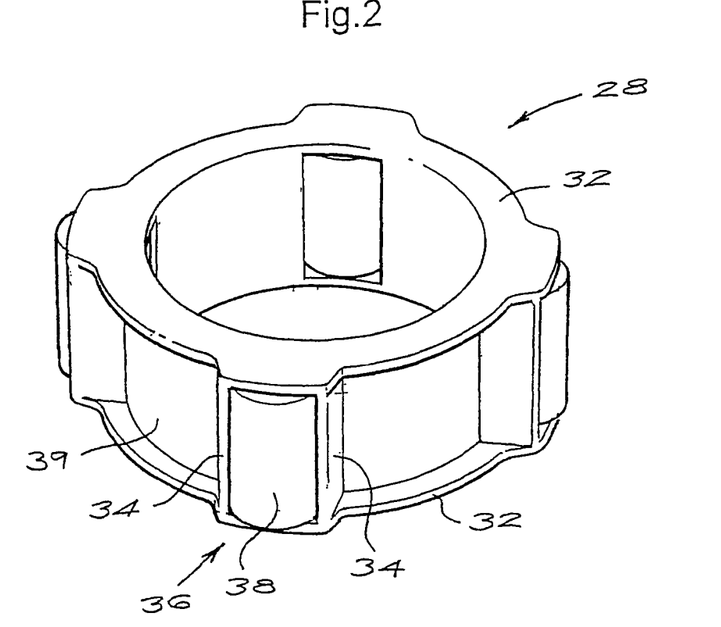
FIG. 2 is a perspective view of a locking housing.
Figure 3:
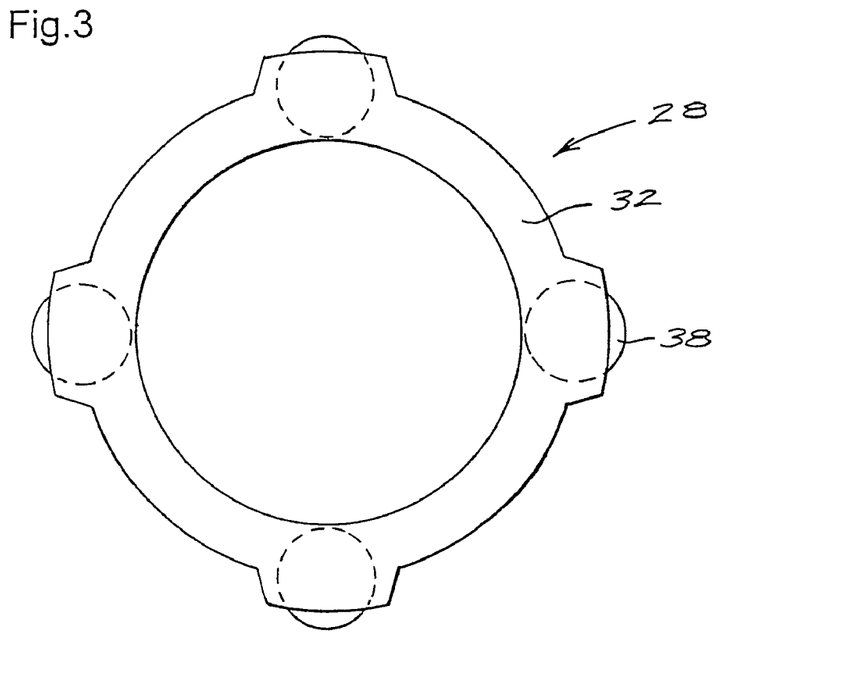
FIG. 3 is a plan view of the locking housing with its rollers displaced radially outwardly.
Figure 4:
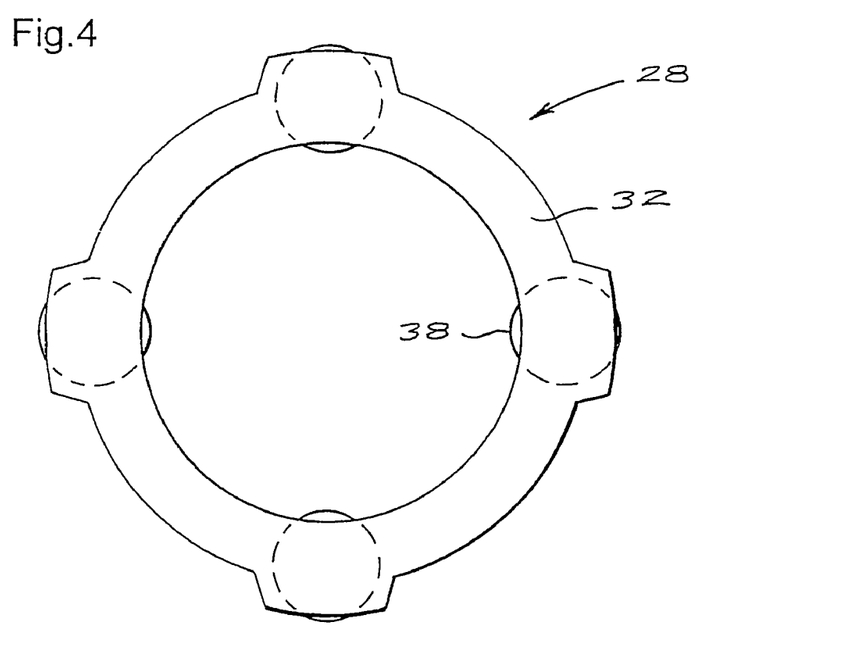
FIG. 4 is the same view as FIG. 3 but with the rollers displaced radially inwardly.

Referring now to FIGS. 2 to 4, the locking housing 28 consists of two axially spaced members in the form of rings 32 with four pairs of spaced walls 34 extending between the rings 32 to define four cages 36 for rollers 38. The cages 36 project radially outwardly from the rings 32. A reinforcing web 39 extends between the rings 32. The rollers 38 can rotate within their cages 36 and can also move radially within their cages 36 as can be seen from FIGS. 3 and 4.

Figure 5:
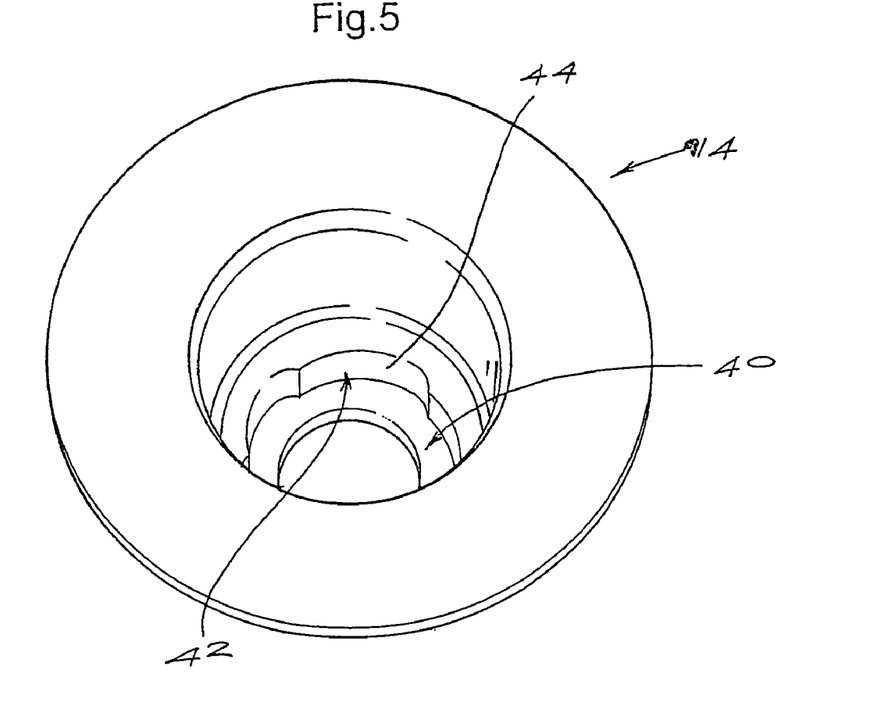
FIG. 5 is a perspective view from the inside of an end cap of the idler roller.
Figure 6:
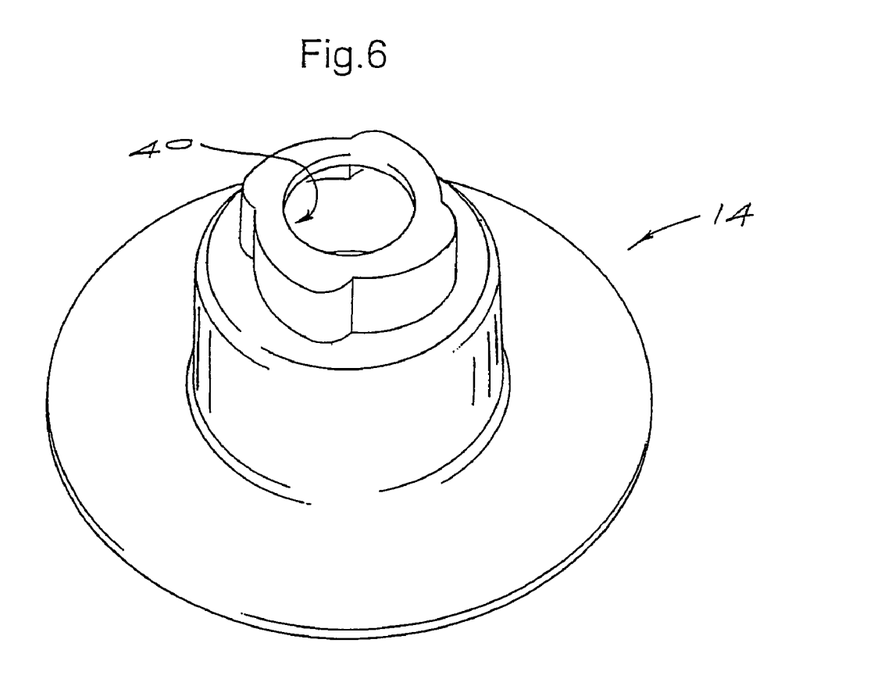
FIG. 6 is a perspective view from the outside of the end cap.

Referring now to FIGS. 5 and 6, the end cap 14 has a locking housing receiving zone 40. This zone 40 has four recesses 42 each with a ramp 44. Conveniently the end cap 14 is a pressing or a moulding. However the locking housing receiving zone 40 may be manufactured separately to the end cap 14 and subsequently secured to the end cap 14.

Figure 7:
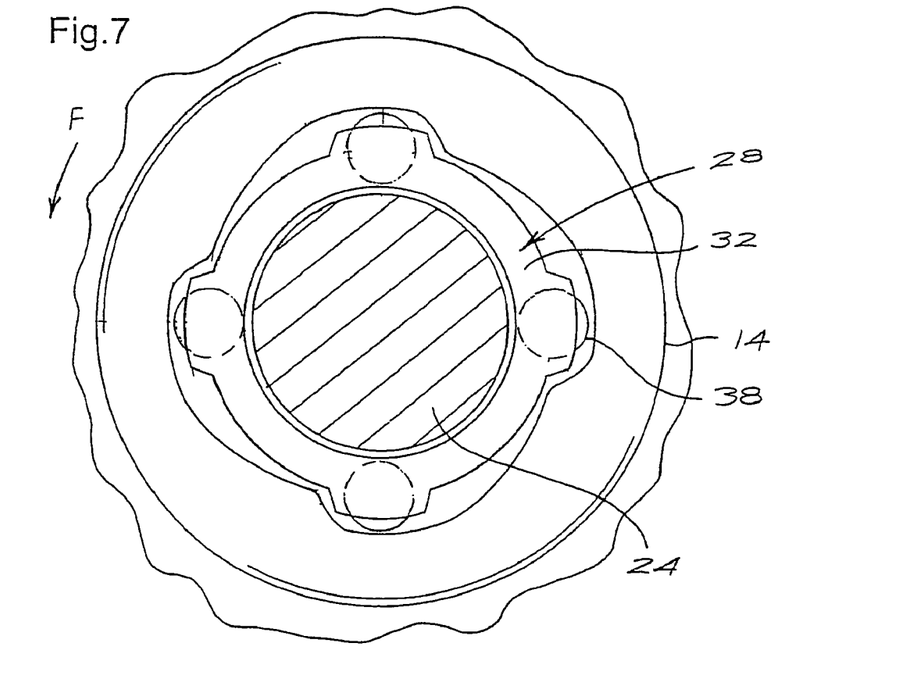
FIG. 7 is an end view of an end cap containing the locking housing in its unlocked position.
Figure 8:
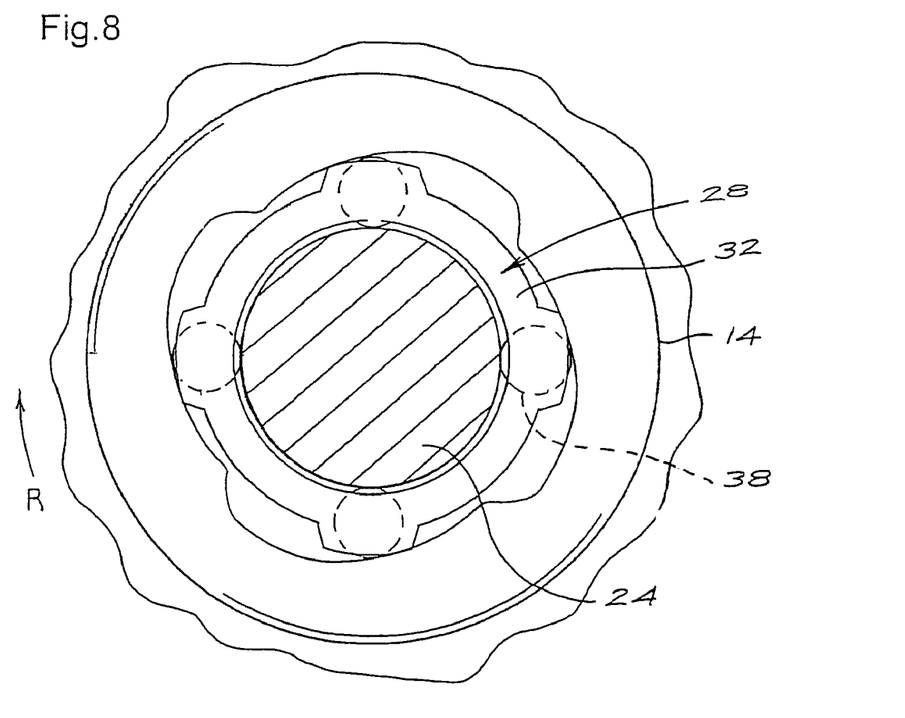
FIG. 8 is the same view as FIG. 7 but with the locking housing in its locked position.
Figure 9:
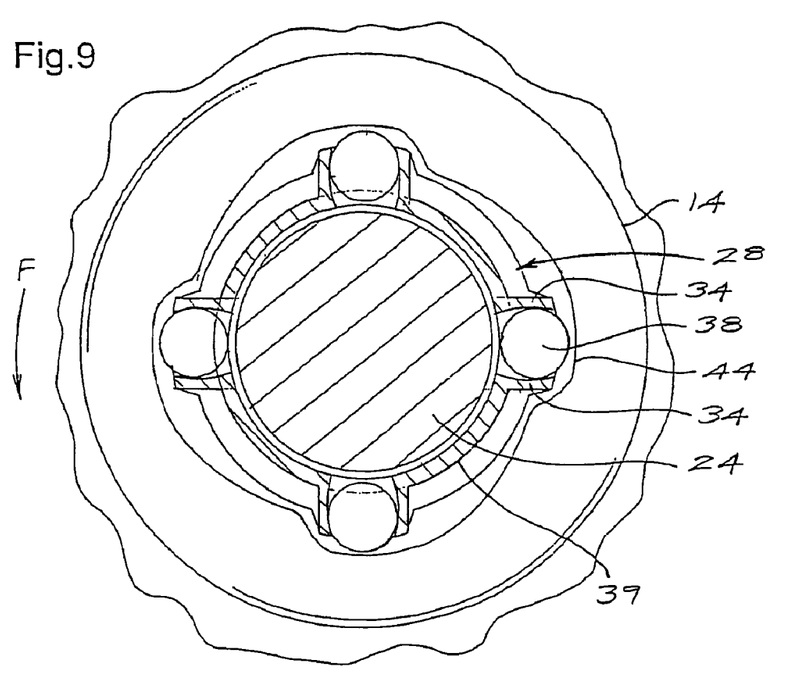
FIG. 9 is a cross-sectional view on line II-II of FIG. 1 in an unlocked position.
Figure 10:
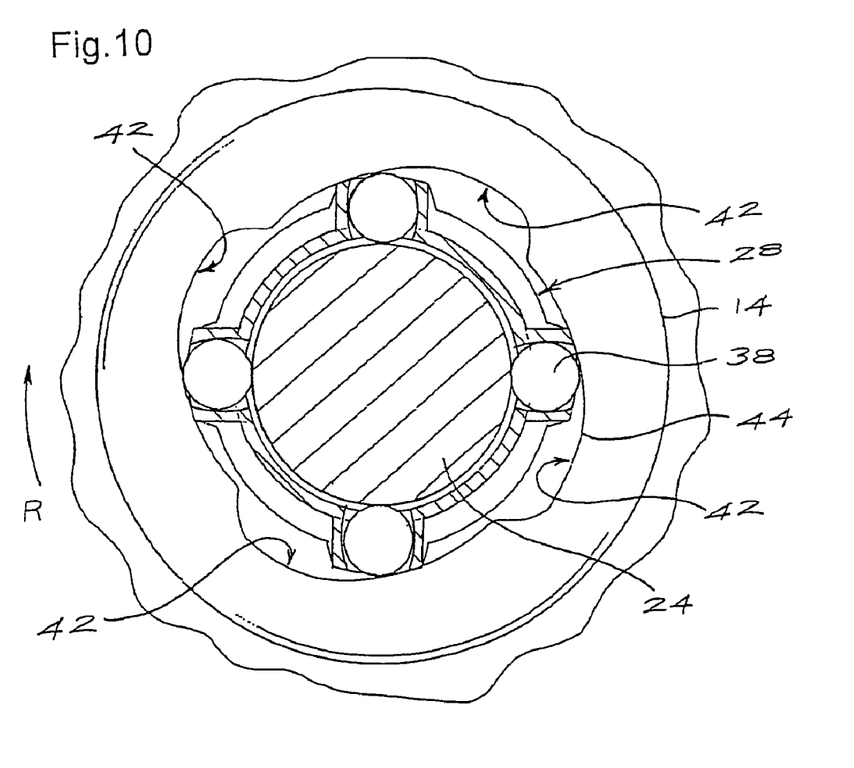
FIG. 10 is the same view as FIG. 9 but in a locked position.

In FIGS. 7 and 8 the locking housing 28 is shown in its unlocked and locked positions respectively in the end cap 14. How the locking housing 28 moves between these two positions is described with reference to FIGS. 9 and 10. Referring in this regard firstly to FIG. 9, when the drum 12, and hence the end cap 14, rotate in the direction of arrow F, the locking housing 28 is located in the position shown with its rollers 38 at the back of their ramps 44 and out of engagement with the shaft 24. However when the drum 12, and hence the end cap 14, attempt to rotate in the direction of arrow R as shown in FIG. 10, the locking housing 28 moves relative to the end cap 14 to the position shown which is the locked position. In this locked position the rollers 38 have moved up their ramps 44 to become releasably wedged between their ramps 44 and the shaft 24 to lock the end caps 14 and hence the drum 12, to the shaft 24 thereby to prevent rotation of the drum 12 relative to the shaft 24. Once the direction of rotation is reversed back to that shown in FIG. 9, the rollers 38 move down their ramps 44 out of engagement with the shaft 24 enabling the end cap 14 and hence the drum 12 to rotate relative to the shaft 24 again.

The locking housing 28 ensures that the circumferential spacing between rollers 38 does not vary, and therefore that all four rollers 38 will simultaneously engage the shaft 24 when an attempt is made to reverse the direction of rotation of the drum 12. This has the advantage that the locking torque is shared equally between the four rollers 38.

Figure 11:
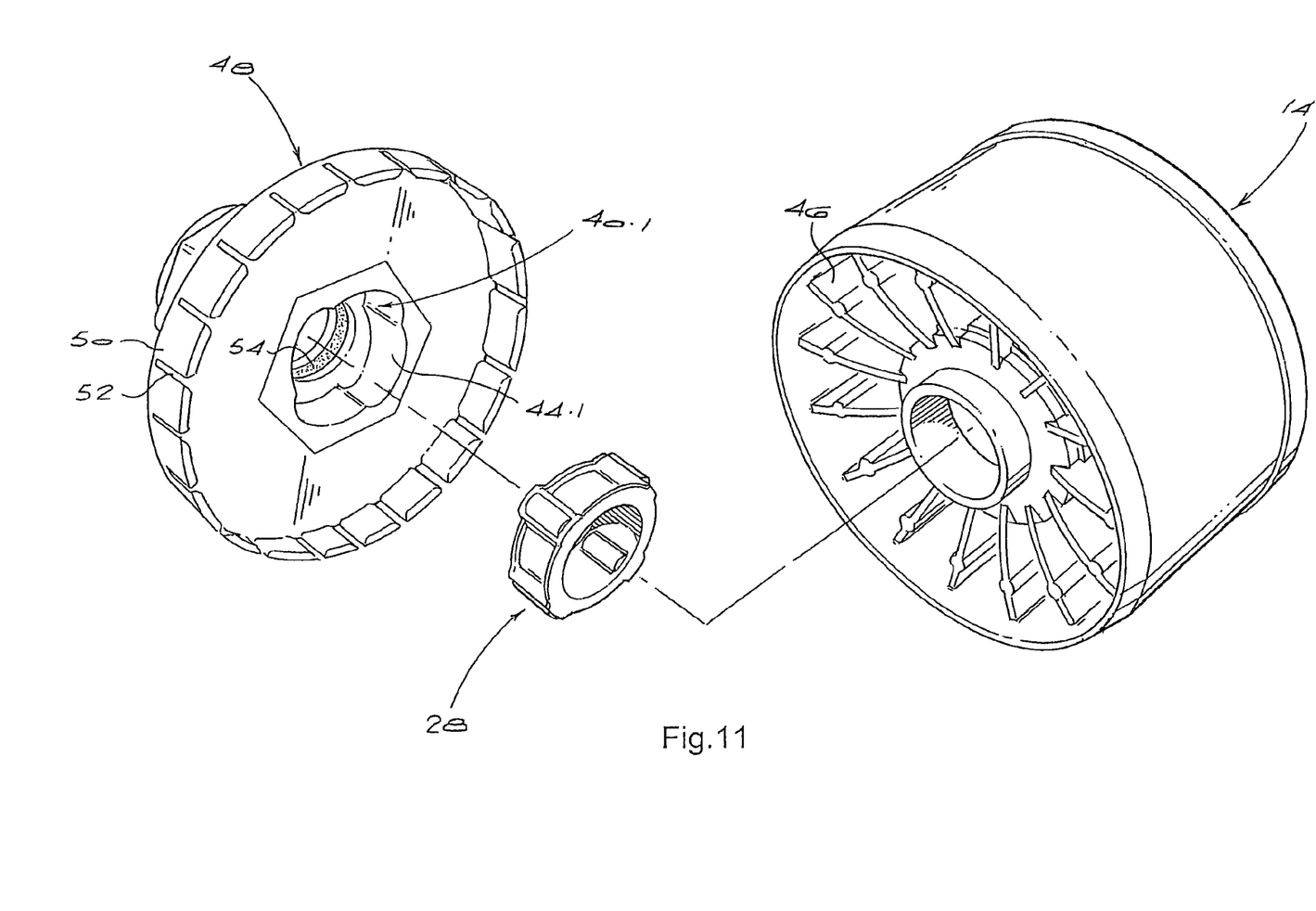
FIG. 11 is an exploded perspective view of an end cap according to another embodiment of the invention.
Figure 12:
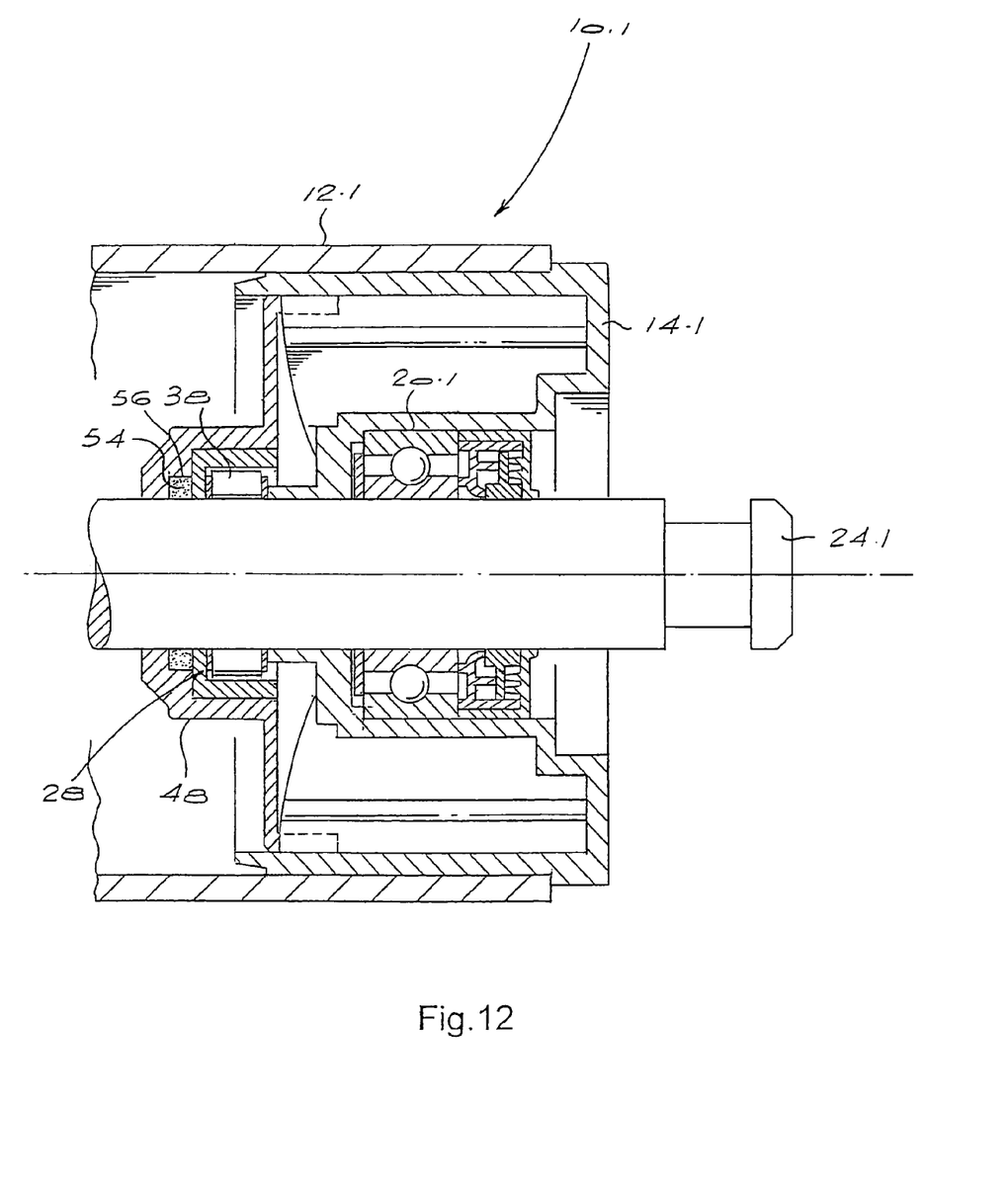
FIG. 12 is an assembled cross-sectional view of the end cap of FIG. 11.
Figure 13:
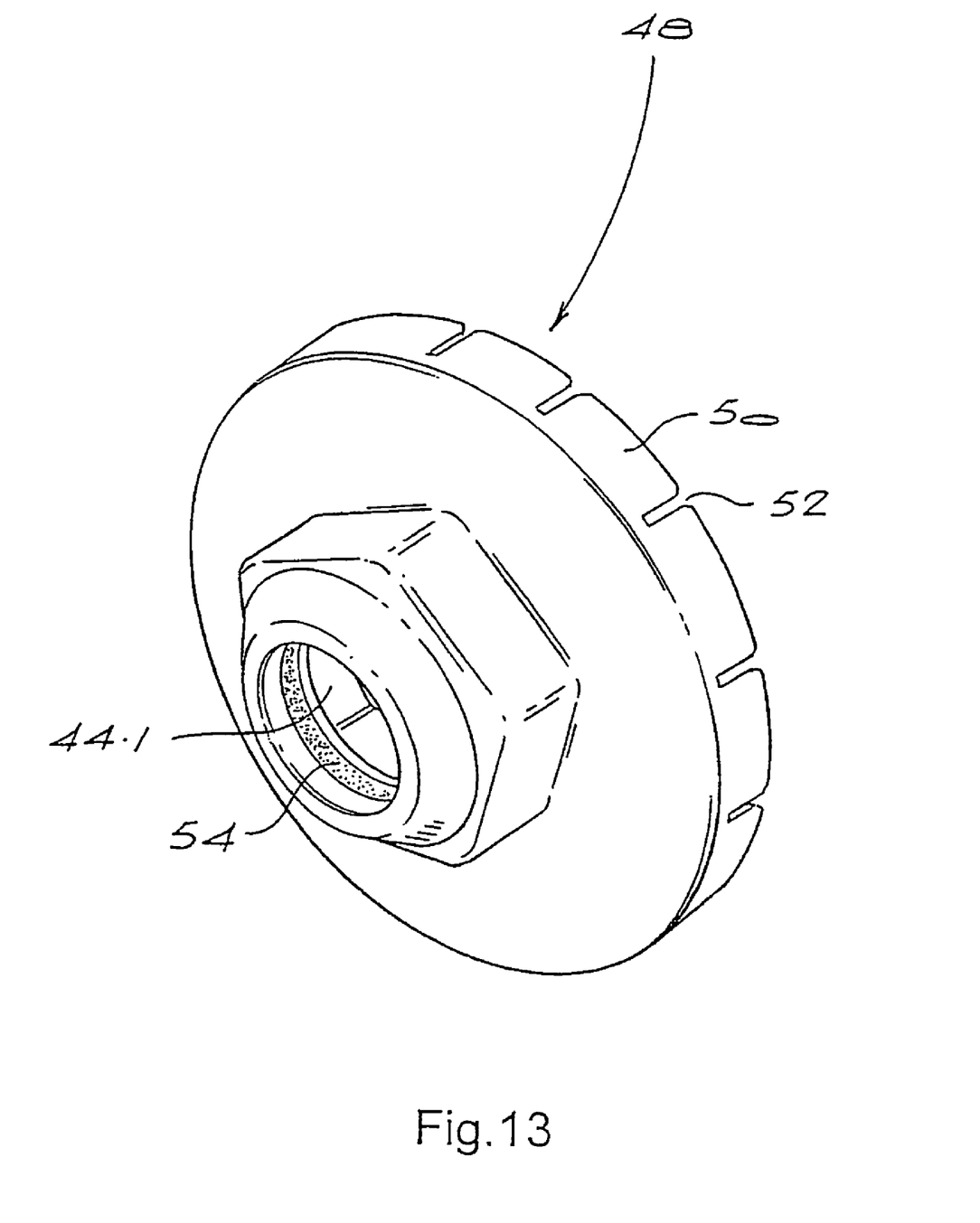
FIG. 13 is a perspective view from the outside of the locking housing receptacle of the end cap of FIG. 11.

Referring now to FIGS. 11 and 12 a nylon end cap 14.1 includes a bearing housing 20.1 and a locking housing receptacle 48 which has a locking housing receiving zone 40.1 and a lip 50 with circumferentially spaced slots 52. The end cap 14.1 has radially extending ribs 46. The spacing between the slots 52 is the same as that between the extremities of the ribs 46 so that the ribs 46 can locate within the slots 52 rotatably to lock the locking housing receptacle 48 to the end cap 14.1.

The locking housing receiving zone 40.1 is formed of mild steel and is an insert in the nylon locking housing receptacle 48. It will however be appreciated that the locking housing receiving zone 40.1 could be made of nylon and thus be integrally moulded with the locking housing support 48.

A seal 54 is provided in a groove 56 in the locking housing receptacle 48. The seal 54 prevents the ingress of foreign matter to the end cap 14.1 and the locking housing 28.

In use, when an attempt is made to rotate the conveyor idler drum 12.1 of the conveyor idler 10.1, into which the end cap 14.1 is a press fit, in the reverse direction the rollers 38 simultaneously wedge between their ramps 44.1, and lock the drum 12.1 from rotating in the reverse direction. The locking torque is transmitted from the shaft 24.1, which cannot rotate, through the rollers 38, through the locking housing receptacle 48, to the drum 12.1.

Although the locking housing receptacle 48 is shown fixed to the end cap 14.1 and located inside the drum 12, the locking housing receptacle 48 could be fixed directly to the drum 12 or, for example, via webs (not shown) extending radially inwardly from the inner surface of the drum 12 of the conveyor idler and the locking housing receptacle 48 could also be located outside the drum 12.

Figure 14:
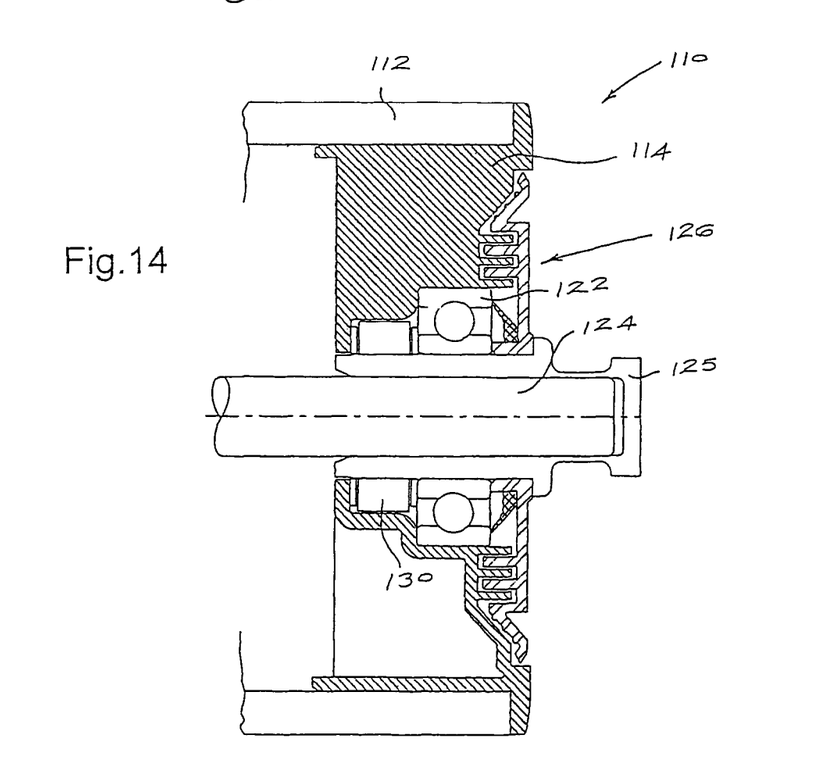
FIG. 14 is a cross-sectional view of a conveyor idler according to another embodiment of the invention.

Referring now to FIG. 14 a conveyor idler 110 is shown which is suitable for lighter-weight applications. The idler 110 includes a drum 112 which is rotatable on bearings 122 about a shaft 124. The shaft 124 is held in end sockets 125 which are mountable to a conveyor frame (not illustrated). The end sockets 125 are fixed to the shaft. A locking housing 130 is fixed to end caps 114 (only one of which is shown). It will be appreciated that the rollers (not shown) of the locking housing 130 become wedged between the surface of the end socket 125 and their wedging surfaces (not shown). The end caps are formed from a plastics material and are sized to form a friction fit with the conveyor drum 112. Seals 126 prevent the ingress of dirt and other undesirable substances into the bearing housings containing the bearings 122.

It will be appreciated that many modifications or variations of the invention are possible without departing from the spirit or scope of the invention.

The invention claimed is:

1. A conveyor idler including a drum having an outer surface and an inner surface, a shaft about which the drum can rotate in a forward direction, a locking mechanism for preventing the drum from rotating in a reverse direction but which locking mechanism permits rotation of the drum in the forward direction, the locking mechanism having a plurality of wedging surfaces fixed directly or indirectly to the drum, and a plurality of locking members interposed between the wedging surfaces and the shaft, the plurality of locking members being rotatable about the shaft when the drum rotates in the forward direction, but when an attempt is made to rotate the drum in the reverse direction the plurality of locking members becomes releasably wedged between the wedging surfaces and the shaft, or a surface fixed to the shaft, thereby preventing the drum from rotating in the reverse direction wherein the plurality of locking members are located in a locking housing, the locking housing consisting of two axially spaced end members, the locking housing being located between the drum and the shaft, the locking housing having circumferentially spaced cages formed between the end members and between pairs of spaced axially extending walls located between the end members wherein the cages extend radially outwardly beyond the circumference of the end members for the locking members to ensure the circumferential spacing between the locking members does not vary.

2. The conveyor idler of claim 1 wherein each locking member is rotatably located within its cage.

3. The conveyor idler of claim 1 wherein each locking member is radially movable within its cage.

4. The conveyor idler of claim 1 including a reinforcing web extending between the end members.

5. The conveyor idler of claim 1 wherein the wedging surface includes a ramp.

6. The conveyor idler of claim 1 wherein the wedging surface forms part of, or is fixed to, an end cap or closure of the drum, the end cap or closure being fixed to the drum.

7. The conveyor idler of claim 6 wherein the wedging surface is located within a locking housing receptacle which is fixed to the end cap.

8. The conveyor idler of claim 7 wherein the locking housing receptacle includes a plurality of circumferentially spaced slots which engage a plurality of radially extending webs in the end cap thereby to fix the locking housing receptacle to the end cap.

9. The conveyor idler of claim 1 wherein the wedging surface is located within a locking housing receptacle which is fixed to the inner surface of the drum.

10. The conveyor idler of claim 1 wherein the locking member is a ball bearing or roller bearing.

11. The locking mechanism of claim 1 wherein the locking members will simultaneously become releasably wedged between the shaft and the wedging surfaces thereby preventing the drum from being rotated in the reverse direction.

12. A conveyor idler including a drum having an outer surface and an inner surface, a shaft about which the drum can rotate in a forward direction, a locking mechanism for preventing the drum from rotating in a reverse direction but which locking mechanism permits rotation of the drum in the forward direction, the locking mechanism having a plurality of wedging surfaces fixed directly or indirectly to the drum, wherein the wedging surface forms part of, or is fixed to, an end cap or closure of the drum, the end cap or closure being fixed to the drum, and a plurality of locking members interposed between the wedging surfaces and the shaft, the plurality of locking members being rotatable about the shaft when the drum rotates in the forward direction, but when an attempt is made to rotate the drum in the reverse direction the plurality of locking members becomes releasably wedged between the wedging surfaces and the shaft, or a surface fixed to the shaft, thereby preventing the drum from rotating in the reverse direction wherein the plurality of locking members are located in a locking housing, the locking housing being located between the drum and the shaft, the locking housing having circumferentially spaced cages for the locking members to ensure the circumferential spacing between the locking members does not vary.

13. The conveyor idler of claim 12 wherein each locking member is rotatably located within its cage.

14. The conveyor idler of claim 12 wherein each locking member is radially movable within its cage.

15. The conveyor idler of claim 12 wherein the locking housing consists of two axially spaced end members, with the cages being formed between the end members and between pairs of spaced axially extending walls located between the end members.

16. The conveyor idler of claim 15 wherein the cages extend radially outwardly beyond the circumference of the end members.

17. The conveyor idler of claim 15 including a reinforcing web extending between the end members.

18. The conveyor idler of claim 10 wherein the wedging surface includes a ramp.

19. The conveyor idler of claim 10 wherein the wedging surface is located within a locking housing receptacle which is fixed to the end cap.

20. The conveyor idler of claim 17 wherein the locking housing receptacle includes a plurality of circumferentially spaced slots which engage a plurality of radially extending webs in the end cap thereby to fix the locking housing receptacle to the end cap.

21. The conveyor idler of claim 10 wherein the wedging surface is located within a locking housing receptacle which is fixed to the inner surface of the drum.

22. The conveyor idler of claim 10 wherein the locking member is a ball bearing or roller bearing.

23. The locking mechanism of claim 10 wherein the locking members will simultaneously become releasably wedged between the shaft and the wedging surfaces thereby preventing the drum from being rotated in the reverse direction.

* * * * *